United States Patent [19]

Juy, deceased

[11] 4,156,371

[45] May 29, 1979

[54] MULTI-FUNCTIONAL CONTROL LEVER FOR SPEED CHANGE DEVICES OF BICYCLES AND SIMILAR VEHICLES

[75] Inventor: Lucien C. H. Juy, deceased, late of Dijon, France, by Henri Juy, heir

[73] Assignee: Le Simplex, Dijon, France

[21] Appl. No.: 783,726

[22] Filed: Apr. 1, 1977

[30] Foreign Application Priority Data

Apr. 2, 1976 [FR] France ................. 76 10603

[51] Int. Cl.² ............... G05G 11/00; F16C 1/10
[52] U.S. Cl. ....................... 74/489; 74/487; 74/501 R; 74/146
[58] Field of Search ......... 74/501 R, 146, 157, 74/501.5, 502, 503, 504, 505, 506, 507, 508, 484 R, 486, 487, 488, 489, 570, 571 R, 571 L, 571 M; 416/201 R

[56] References Cited

U.S. PATENT DOCUMENTS

| | | | |
|---|---|---|---|
| 2,129,320 | 9/1938 | Geairns | 74/501.5 X |
| 2,152,376 | 3/1939 | Endicott | 74/505 X |
| 2,817,247 | 12/1957 | Weinfurt et al. | 74/502 |
| 3,369,416 | 2/1968 | Kilness | 74/157 |
| 3,376,756 | 4/1968 | Yasue | 74/751 X |
| 3,426,614 | 2/1969 | Brilando et al. | 74/487 X |
| 3,739,741 | 6/1973 | Freyermuth | 74/501 X |
| 3,972,247 | 8/1976 | Armstrong | 74/501 X |
| 4,041,797 | 8/1977 | Mito | 74/502 X |
| 4,046,025 | 9/1977 | Ozaki | 74/501 |
| 4,055,093 | 10/1977 | Ross | 74/501 |

FOREIGN PATENT DOCUMENTS

| | | | |
|---|---|---|---|
| 521522 | 8/1953 | Belgium | 74/489 |
| 929792 | 1/1948 | France | 74/489 |
| 936153 | 7/1948 | France | 74/489 |
| 1121806 | 8/1956 | France | 74/489 |
| 16245 of | 1904 | United Kingdom | 74/489 |
| 906492 | 9/1962 | United Kingdom | 74/489 |

*Primary Examiner*—Samuel Scott
*Assistant Examiner*—Don E. Ferrell
*Attorney, Agent, or Firm*—Haseltine, Lake, Waters

[57] ABSTRACT

A multi-functional control lever adapted for selectively operating on a front speed change device or a rear speed change device of a bicycle comprising a manually manipulable handle portion and a mounting portion rotatably mounted on a shaft. The lever has a housing for receiving a pin on the extremity of the cable and the cable is wound on one of two surfaces of the lever having different radii measured from the axis of rotation of the lever. The surfaces of different radii are brought into operative position by simple reversal of the lever on the shaft. The levers can be mounted at opposite sides of a common support block which supports the shaft and is attached to the frame of the bicycle.

9 Claims, 8 Drawing Figures

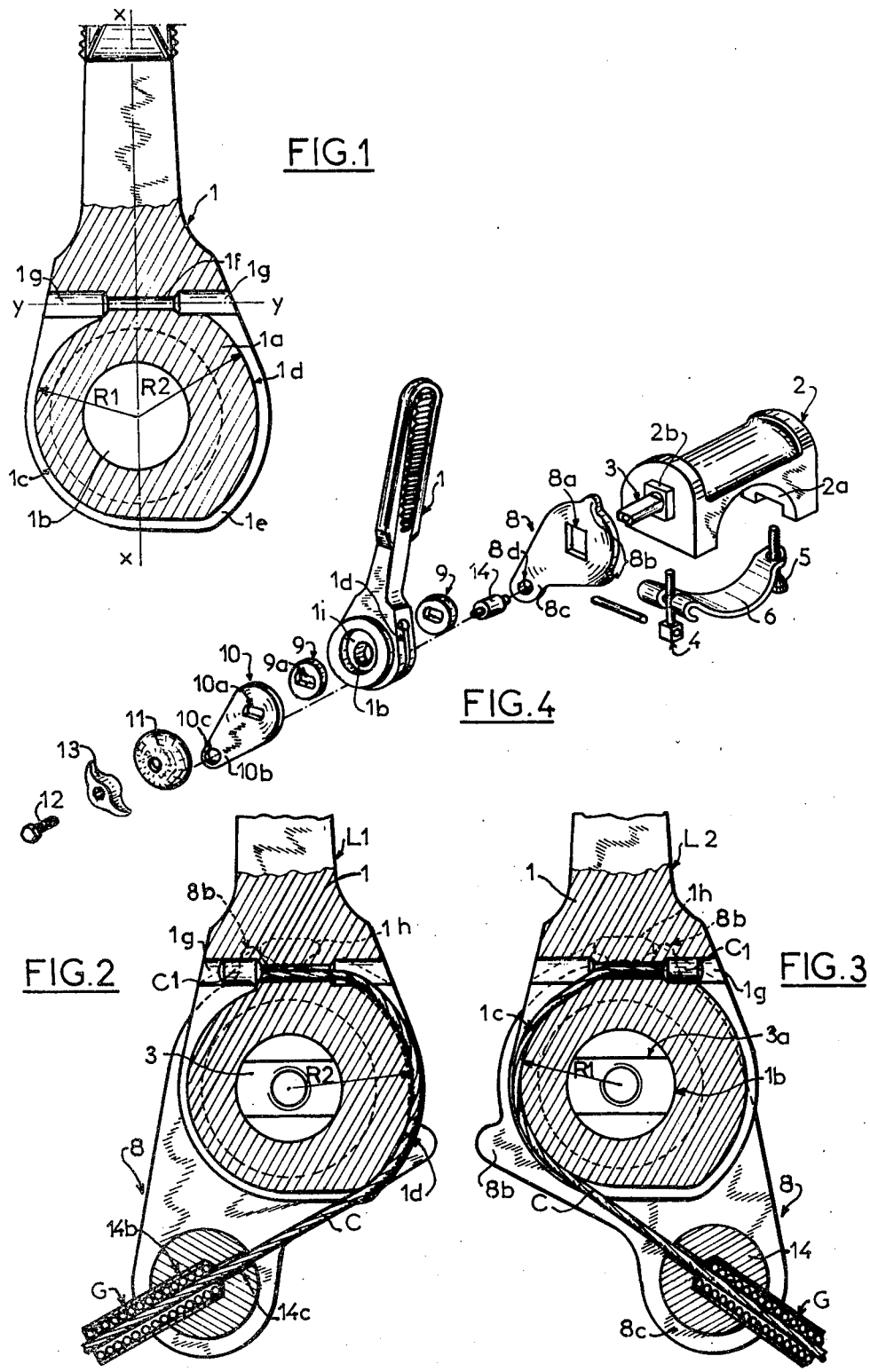

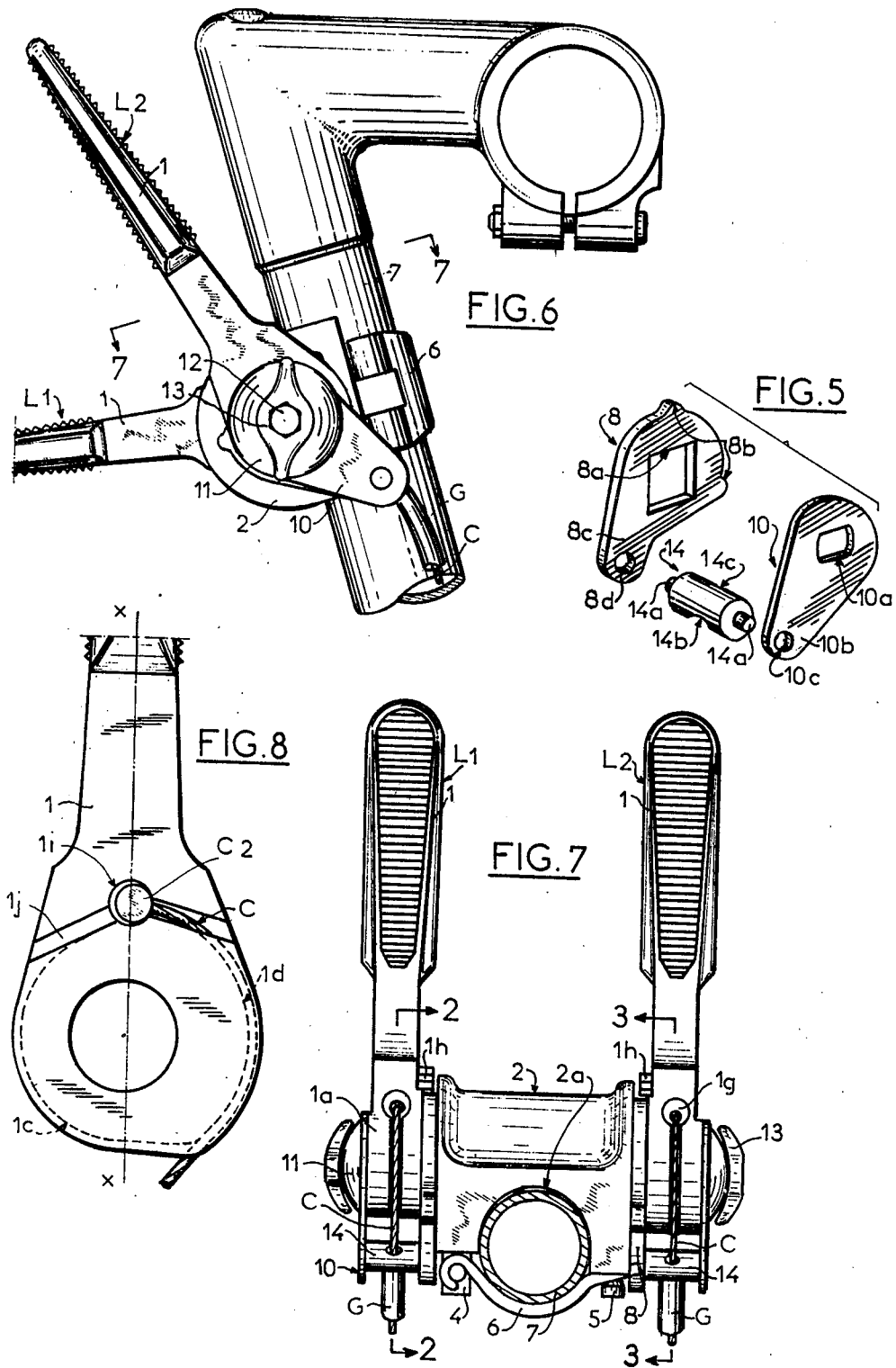

MULTI-FUNCTIONAL CONTROL LEVER FOR SPEED CHANGE DEVICES OF BICYCLES AND SIMILAR VEHICLES

FIELD OF THE INVENTION

The invention relates to a multi-functional control lever for a speed change device for bicycle and similar vehicles.

The invention is particularly directed to control means of the front and rear speed change devices of bicycles and similar vehicles.

BACKGROUND

The controls of front speed change devices (at the crank gear) or rear speed change devices (pinions of the free-wheel cluster) are effected generally by means of a cable system activated by a lever and which acts on a member of the speed change device for displacing the chain.

The displacements of the cable and as a consequence the pivotable movements of the lever or equivalent control member are different according to whether the lever controls the front speed change device or the rear speed change device or even according to the types of speed change devices. For these reasons, the levers utilized must be specially constructed as a function of the controlled speed change device.

It is, therefore, necessary to manufacture a plurality of types of levers which is very costly. It is necessary to have a storage capability and corresponding distribution facilities. Complications and difficulties result therefrom.

SUMMARY OF THE INVENTION

An object of the invention is to remedy these disadvantages and to this effect a multi-functional control lever is provided for the speed change device which is characterized in that it has in the same plane two semi-cylindrical support surfaces of different radii in which one surface is selected as desired by simple reversal of the level on a mounting shaft, the winding and support of the cable from its point of attachment to the lever being on one or the other of the semi-cylindrical surfaces according to the speed change device to be controlled.

Specifically, the invention contemplates a multi-functional control lever for speed change devices for a bicycle, comprising a body including a handle portion and a mounting portion mountable on a shaft for rotation about an axis and including means for attachment of a cable to the body such that rotation of the lever controls traction of the cable, said mounting portion having surfaces of different radii measured from the axis of rotation for bearing support of the cable such that by reversal of the lever on the shaft said surfaces of different radii are selectively operatively positioned for receiving the cable.

BRIEF DESCRIPTION OF THE DRAWING

FIG. 1 is a partial sectional view of a multi-functional lever according to the invention;

FIG. 2 is a view in partial section taken along line 2—2 in FIG. 7 illustrating the winding of the cable on the larger diameter of the lever to control a rear speed change device, the lever being shown in position of maximum winding of the cable when the chain is on the largest pinion of the freewheel cluster;

FIG. 3 is a view in partial section taken along line 3—3 in FIG. 7 illustrating the winding of the cable on the smaller diameter of the lever to control a front speed change device, the lever being shown in position of maximum winding of the cable, when the chain is on the larger toothed wheel of the crank gear;

FIG. 4 is an exploded view showing an embodiment for mounting of the lever according to the invention on means for attachment to an element of the bicycle, only one side of the mounting being shown with the elements separated and aligned in their order of mounting;

FIG. 5 is a perspective view illustrating the mounting of a self-orientable sheath stop;

FIG. 6 is a front view showing the control levers for the front and rear speed change devices as shown in FIG. 4, the assembly being shown fixed on the handle bar shaft, the levers being in intermediate position;

FIG. 7 is a front view taken along line 7—7 in FIG. 6 showing the two levers in position of maximum winding of the control cables; and FIG. 8 is a partial side view of a lever illustrating a housing in the lever for receiving a corresponding extremity of the cable according to a modified embodiment.

DETAILED DESCRIPTION

In FIG. 1 is seen a control lever 1 having a manually engageable upper handle portion and a lower base or hub 1a having a bore 1b serving as a mounting portion for free rotational engagement on a shaft 3 in a manner to be described more fully later.

The hub of the lever is unsymmetrical with respect to axis X—X in order to form on one side a groove 1c of radius R1 and on the other side a groove 1d of radius R2 which is greater than the radius R1, the two grooves being joined at 1c to form a base. Along axis Y—Y perpendicular to the axis X—X and situated substantially at the point of tangency of the grooves is a bore 1f for the passage of the control cable and at each extremity of this bore there are formed enlarged bores 1g serving as a housing for abutment of pin C1 on the cable C (FIGS. 2 and 3).

As seen in FIGS. 2 and 3, the lever 1 can be reversibly mounted on the shafts to selectively engage the cable in one groove or the other (1c or 1d) to permit utilization of the same lever to selectively control a front or a rear speed change device. This simplifies substantially the problems of storage and of manufacture and permits reduction in the price of the lever while effecting very adaptable control for the type of speed change device.

FIG. 2 shows the lever 1 mounted for free rotation on shaft 3 and control cable C is wound in the groove 1d of radius R2 corresponding to the control of a rear speed change device. In this Figure, the lever 1 is represented in abutment with its projection 1h against a projection 8b of a sector plate 8 whose lower extremity serves as support for sheath stop 14 as will be described later. This abutment position for maximum traction of the cable corresponds to the position of the chain on the largest pinion on the free wheel cluster.

FIG. 3 shows the control lever positioned reversely on shaft 3 so that the control cable C is wound in groove 1c of radius R1. In the same manner as in FIG. 2, the lever is in a position of maximum traction of the cable, that is to say, the chain is on the larger toothed wheel of the crank gear.

FIGS. 2–7 illustrate in non-limitative manner the mounting of two coupled levers on an attchment assembly secured to a frame element of the bicycle.

The lever L1 in FIGS. 2, 6 and 7 is the control lever for the rear speed change device and the lever L2 in FIGS. 3, 6 and 7 is the control lever for the front speed change device.

Of course, only one multi-functional lever can be mounted on a shaft and can control, respectively, the front or rear speed change device by simple reversal on the shaft in order that the control cable is wound on the radius R1 or the radius R2.

In the illustrated case of the coupled levers L1 and L2 the mounting, described only by way of example in FIG. 4, comprises a block 2 having a semi-cylindrical bore at 2a which is traversed by shaft 3 maintained axially and angularly in block 2 by bolts 4 and 5 engaging a semi-cylindrical strap 6. The bolts 4 and 5 traverse the block and are threadably engaged in the shaft 3. The block and strap are placed and locked on a frame element 7 (FIG. 6) by tightening bolts 4 and 5.

Secured at each extremity of the block is a polygon-shaped plate 2b which engages a corresponding orifice 8a in a plate 8 which has, in known manner, projections 8b serving as abutments for the travel of projection 1h on the lever 1 which is mounted after the plate 8.

The lever has cylindrical recesses 1i in its side faces receiving rings 9. The rings 9 have a central opening with flats 9a for engagement on a correspondingly shaped extremity 3a of the shaft, said lever being rotatable around said shaft 3 with a circular travel.

Mounted on the flats 3a on the extremity of shaft 3 at the end of the lever at exterior ring 9 is a plate 10 having a hole with flats 10a thereon, and then an elastic washer 11 for adjustable locking of the lever on the shaft through the intermediary of a blot 12 threaded in the shaft and a wing nut 13.

The sector 8 and the plate 10 have respective projections 8c and 10b oriented with respect to their openings 8a and 10a in order to be aligned when mounted, these projections receiving in free rotation in orifices 8d and 10c supports 14a of a cylindrical portion of sheath stop 14 which constitutes an abutment for the sheath of cable C as best seen in FIGS. 2 and 3 wherein sheath stop 14 has an enlarged bore 14b connected to a bore 14c for passage of the cable.

This free mounting or self-orientation of the sheath stop 14 is necessary to place the outlet end of the cable always in alignment in the bore 14c whatever the radius of the selected groove to avoid abrasion of the cable.

In FIG. 6 the coupled levers are fixed on a handle bar shaft 7 that is to say under the handle bar bracket. The cables leaving the levers pass into the sheath stops and enter the sheaths G which extend along the length of the handle bar shaft and the fork cover to attach to the front and rear speed change devices while following the tubes of the frames in known manner.

It is obvious that the attachment of the coupled levers can be also effected at known places on the frame, notably the tube of the frame between the front fork cover and the casing of the crank gear or between the front fork cover and the seat attachment.

In FIG. 8 there is shown a variation of means for attachment of the control cables to the lever.

Herein, the lever 1 has on the vertical axis X—X substantially tangent to the winding grooves of the cable a circular bore 1k for receiving a pastille or enlargement C2 welded to one extremity of the cable C.

The cable is selectively engaged in one or the other of the grooves 1c or 1d by passing in slots 1j in the lever extending from the bore 1k and opening at the periphery of the lever while being substantially tangent to the grooves.

This mounting of the cable only necessitates a single point of attachment of the cable to the lever whatever its direction of winding and slightly diminishes the length of winding of the cable on the lever.

The advantages of the construction according to the invention follow from the description and in particular the following are underlined:

The realization of a single lever to control different speed change devices by reversal of the position of the lever on one side or the other of shaft 3, in the case of the coupled levers, or by turning the lever around its own axis, the control cables being selectively wound on one side or the other of the levers by the embodiment of the two bore housings 1g or the central bore housing 1i.

The precise adaption of the levers to a different path of displacement of the cable by winding the cable in grooves of different radii.

The self-orienting mounting of the sheath stop permitting the alignment of the outlet of the cable with its passage whatever the winding radius selected.

The fixation at any appropriate point to the frame or of its accessories of the levers thus constructed.

The invention is not only limited to the disclosed embodiments, but, in contrast it embraces all variations and modifications which fall within the scope of the appended claims.

What is claimed is:

1. A multi-functional control lever for speed change devices for a bicycle, comprising a body including a handle portion and a mounting portion mountable on a shaft for rotation about an axis and including means for attachment of a cable to the body such that rotation of the lever controls traction of the cable, said mounting portion having surfaces of different radii measured from the axis of rotation for bearing support of the cable such that by reversal of the lever on the shaft, said surfaces of different radii are selectively operatively positioned for receiving the cable.

2. A control lever as claimed in claim 1 wherein the attachment means comprises means for securing an extremity of the cable, the cable then passing on a selected one of said surfaces of different radii.

3. A control lever as claimed in claim 1 wherein said surfaces of different radii are substantially semi-circular.

4. A control lever as claimed in claim 2 wherein said means for securing an extremity of the cable is constituted by one bore in said body serving as a housing securing the extremity of the cable and two second narrower bores for passage of the cable from said housing to a selected one of said surfaces of different radii.

5. A control lever as claimed in claim 4 wherein said one bore extends axially in said body at a point of upper tangency to said surfaces of different radii, said two second narrower bores extending from said one bore externally of the body in substantially tangential relation to a respective one of the surfaces of different radii.

6. A control lever as claimed in claim 2 wherein said means for securing an extremity of the cable is constituted by two bores in said body aligned perpendicularly to said axis and joined by a narrower bore disposed substantially at a point of upper tangency to said surfaces of different radii.

7. A control lever as claimed in claim 1 wherein the cable includes a sheath and a sheath stop is provided for holding the sheath so that the cable exits from the sheath and is attached to the body of the lever while passing on a selected one of the surfaces of different radii and means pivotably coupling said body with said sheath stop to provide alignment of the cable with said sheath stop irrespective of which surface of different radii the cable is wound on.

8. A control lever as claimed in claim 7 wherein said means pivotably coupling the body with the sheath stop comprises fixed plates on said shaft on opposite sides of said body, and means pivotably mounted in said plates and supporting said sheath stop which said sheath stop is freely rotatable to self-align itself with the selected one of the surfaces of different radii.

9. A control lever as claimed in claim 8 wherein said plates abut against said body, means being provided for axially and adjustably forcing said plates against said body to hold said lever axially on said shaft.

* * * * *